United States Patent
Wu

(10) Patent No.: US 9,884,665 B2
(45) Date of Patent: Feb. 6, 2018

(54) BICYCLE PEDAL WITH MAGNETIC MEMBER

(71) Applicant: Meng-Chang Wu, Changhua County (TW)

(72) Inventor: Meng-Chang Wu, Changhua County (TW)

(*) Notice: Subject to any disclaimer, the term of this patent is extended or adjusted under 35 U.S.C. 154(b) by 0 days.

(21) Appl. No.: 15/057,417

(22) Filed: Mar. 1, 2016

(65) Prior Publication Data

US 2017/0253295 A1  Sep. 7, 2017

(51) Int. Cl.
*B62M 3/08* (2006.01)

(52) U.S. Cl.
CPC ..................... *B62M 3/08* (2013.01)

(58) Field of Classification Search
CPC . B62M 3/08; B62M 3/10; B62M 3/16; B62K 23/08; G05G 1/60; Y10T 74/2168
See application file for complete search history.

(56) References Cited

U.S. PATENT DOCUMENTS

| | | | | | |
|---|---|---|---|---|---|
| 4,180,063 | A | * | 12/1979 | Takeuchi | A61H 7/002 601/114 |
| 5,473,963 | A | * | 12/1995 | Aeschbach | A43B 1/0054 36/131 |
| 6,237,929 | B1 | * | 5/2001 | Kielland | B62H 1/08 280/294 |
| 6,550,945 | B2 | * | 4/2003 | Chiu | B62J 6/04 362/192 |
| 6,694,845 | B2 | * | 2/2004 | Campagnolo | B62M 3/08 324/174 |
| 8,262,116 | B2 | * | 9/2012 | Cheng | B62H 1/02 280/294 |
| 9,545,972 | B2 | * | 1/2017 | Williams | B62M 3/086 |
| 2002/0134192 | A1 | * | 9/2002 | Chang | B62M 3/12 74/594.4 |
| 2005/0028639 | A1 | * | 2/2005 | Chang | B62J 6/00 74/594.4 |
| 2011/0302811 | A1 | * | 12/2011 | Chang | A43B 1/0054 36/131 |
| 2012/0018239 | A1 | * | 1/2012 | Britt | B62M 3/08 180/206.4 |
| 2013/0247713 | A1 | * | 9/2013 | Cheng | B62M 3/08 74/594.4 |
| 2017/0106940 | A1 | * | 4/2017 | Paick | B62M 3/086 |

FOREIGN PATENT DOCUMENTS

WO  WO 2006042622 A1 *  4/2006  ........... A43B 1/0054

OTHER PUBLICATIONS

Machine translation of WO 2006042622 A1 obtained on Mar. 16, 2017.*

* cited by examiner

*Primary Examiner* — Adam D Rogers
(74) *Attorney, Agent, or Firm* — Alan D. Kamrath; Kamrath IP Lawfirm, P.A.

(57) ABSTRACT

A bicycle pedal assembly includes a pedal having an axle rotatably extending therethrough to be connected to a crank. At least one magnetic member is connected to the outside of the pedal and attracted to an object such as a wall. The bicycle is positioned at an upright position when the least one magnetic member is attracted to a wall with a proper feature that is magnetically attracted by the at least one magnetic member on the pedal.

2 Claims, 9 Drawing Sheets

BICYCLE PEDAL WITH MAGNETIC MEMBER

BACKGROUND OF THE INVENTION

1. Field of the Invention

The present invention relates to a bicycle pedal assembly and, more particularly, to a bicycle pedal assembly with a magnetic member connected to the outside thereof to be magnetically attracted with a fixed object to keep the bicycle at an upright position.

2. Description of the Prior Art

Conventional bicycles have a kick stand which is used to support the bicycle when not in use. The kick stand is usually connected to one side of the bicycle and is pivoted downward to contact against the ground to support the bicycle at an angle such that the bicycle does not fall. However, the kick stand needs to be installed to the bicycle with extra work and increases the weight of the bicycle. Some bicycles do not have the kick stand, so that the bicycles have to lean on a wall or to be laterally put on the ground. The bicycles are not stable when leaning on a wall and can fall by any impact. The bicycles lying on the ground occupy a lot of space.

Some manufacturers install the kick stand at the pedal. However, the pedal has to be made large enough to be combined with the kick stand. The structure of the pedal also becomes complicated, and the manufacturing cost increases. Besides, the kick stand attached to the pedal cannot provide a reliable support to the bicycle, and the operation of the kick stand is not convenient for some users.

The present invention provides a bicycle pedal which has at least one magnetic member to be attached to an object that is attracted by the at least one magnetic member. By this way, the shortcomings mentioned above are improved.

SUMMARY OF THE INVENTION

The present invention relates to a bicycle pedal assembly and comprises a pedal with an axle rotatably extending there through to be connected to a crank. At least one magnetic member is connected to the outside of the pedal and attracted to an object such as a wall which includes iron, cobalt and nickel. The bicycle is positioned at an upright position when the least one magnetic member is attracted to a wall with a proper feature that is magnetically attracted by the at least one magnetic member on the pedal.

The primary object of the present invention is to provide a pedal assembly which has at least one magnetic member received therein to be magnetically attracted to a wall such as a metal door, post or fence. The bicycle with the pedal assembly can be well positioned at an upright position. The at least one magnetic member occupies limited room and does not increase too much weight. Also, the outer appearance of the pedal does not change much.

The present invention will become more obvious from the following description when taken in connection with the accompanying drawings which show, for purposes of illustration only, preferred embodiments in accordance with the present invention.

DETAILED DESCRIPTION OF THE PREFERRED EMBODIMENTS

Figure 1:
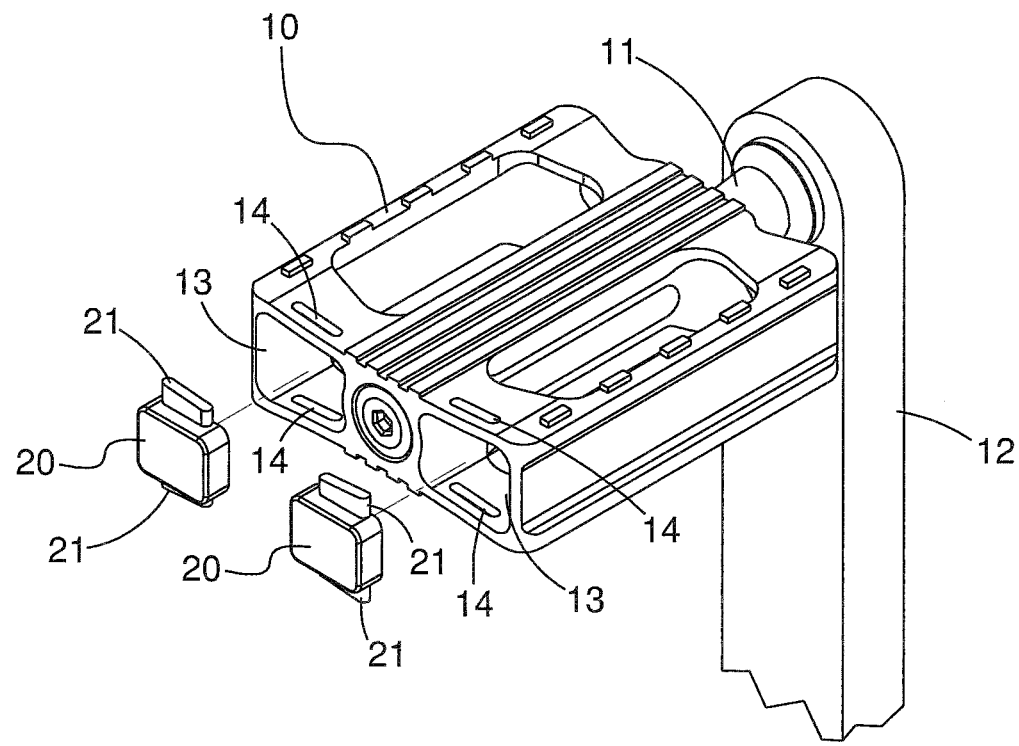
FIG. 1 is an exploded view of the pedal and the magnetic members of the pedal assembly of the present invention.
Figure 2:
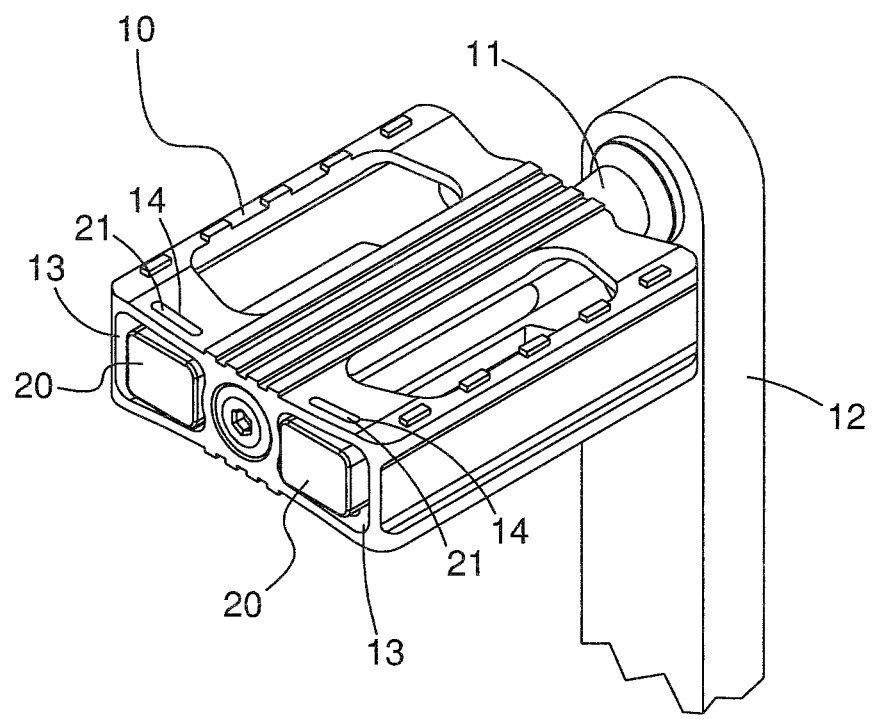
FIG. 2 is a perspective view to show the pedal assembly of the present invention.
Figure 3:
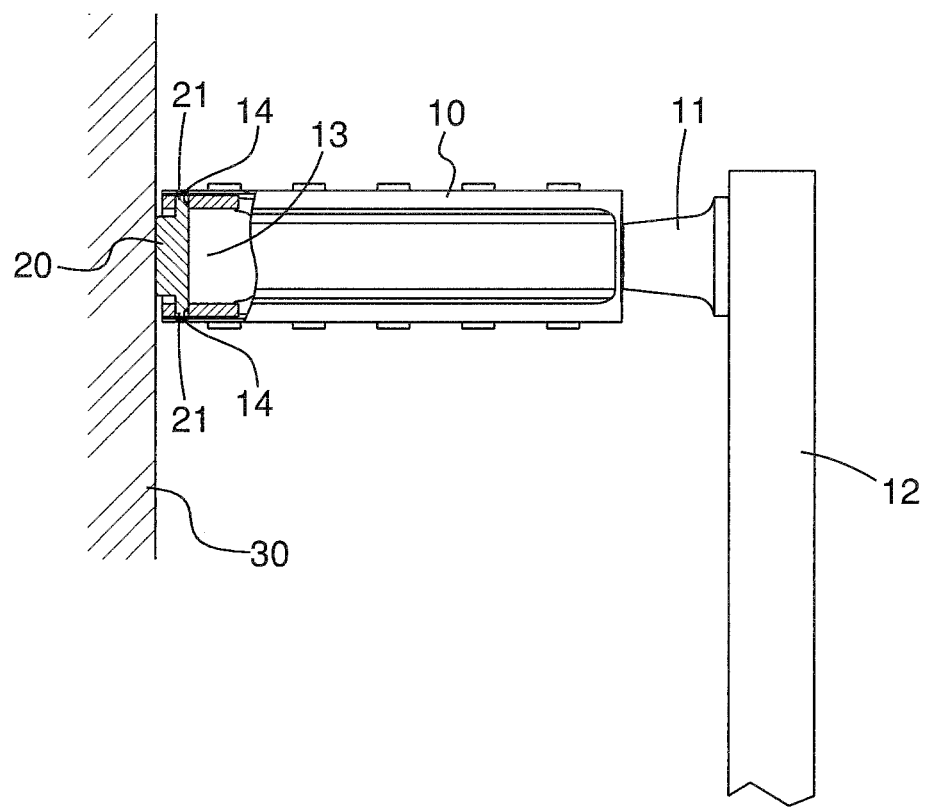
FIG. 3 is a cross sectional view to show that the pedal assembly of the present invention is magnetically attracted by an object.

Referring to FIGS. 1 to 3, the bicycle pedal assembly of the present invention comprises a pedal 10 having an axle 11 rotatably extending there through, and a portion of the axle 11 protrudes from the inside of the pedal 10 to be connected to a crank 12. At least one magnetic member 20 is connected to the pedal 10 and attracted to an object 30 being formed of a magnetic material such as iron, cobalt and nickel. Generally, the magnetic material has magnetic moment which includes a N pole and a S pole, and the N pole and the S pole are arranged randomly, such that the magnetic material does not have a magnetic feature. When a magnet approaches, the N pole and the S pole are arranged in an order such that the magnetic material is magnetically attracted to the magnet.

The pedal 10 includes two rooms 13 defined in the inside thereof, and the axle 11 is located between the two rooms 13. Each room 13 has a slot 14 defined in the top wall and the bottom wall thereof. In this embodiment, there are two magnetic members 20, and each magnetic member 20 has a resilient member 21 on the top and the bottom thereof. The resilient members 21 are respectively engaged with the slots 14 of each room 13 to receive the magnetic member 21 in the room 13. A portion of each magnetic member 20 protrudes beyond an outer surface of the pedal 10.

As shown in FIG. 3, when the pedal 10 is located beside an object 30 having the magnetic material, such as a metal door, metal post or metal fence having at least one of iron, cobalt and nickel therein, the magnetic members 20 are magnetically attracted to the object 30 to position the bicycle in an upright position.

Figure 4:
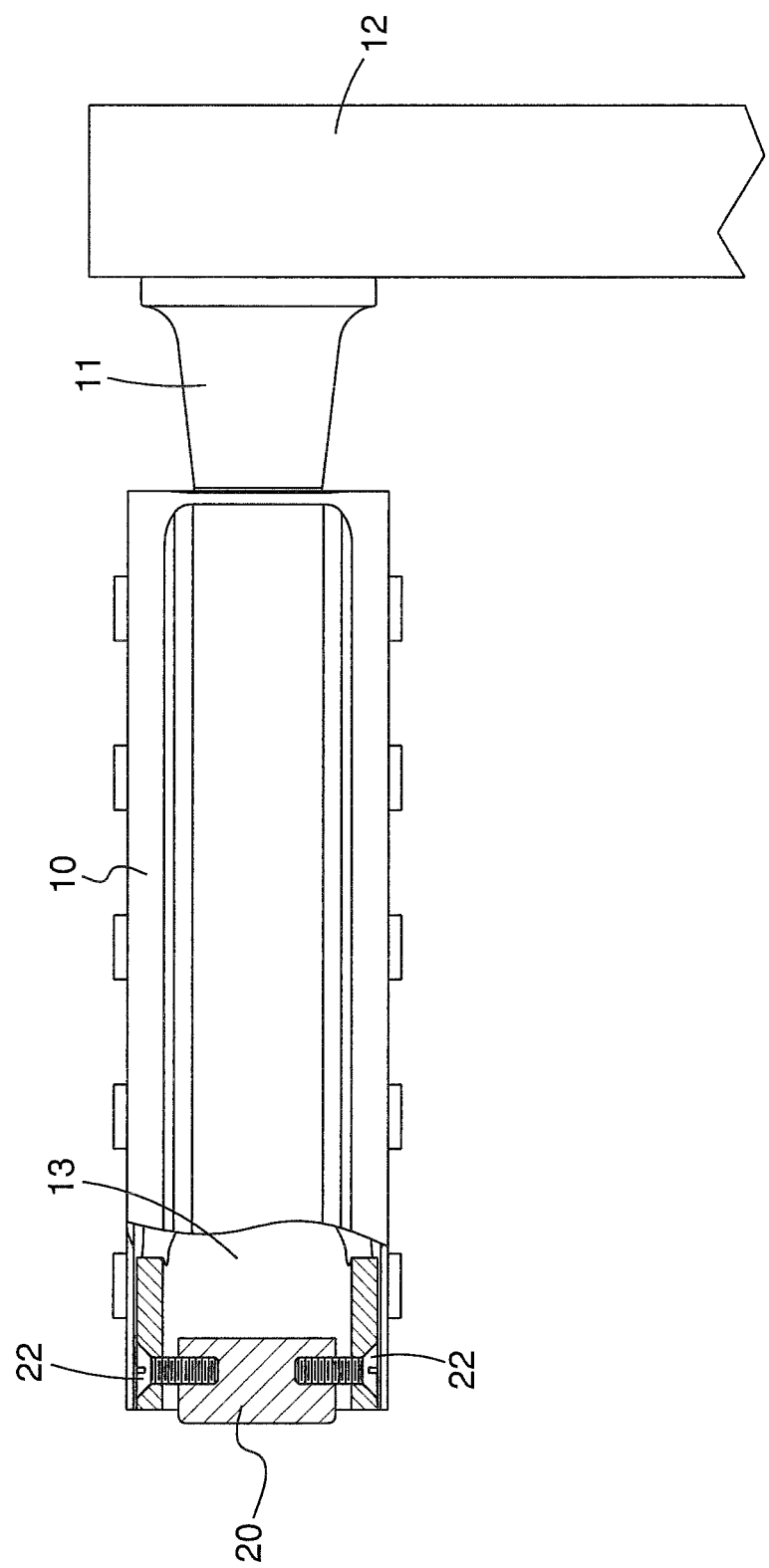
FIG. 4 is a cross sectional view to show the second embodiment of the pedal assembly of the present invention.

FIG. 4 shows that the magnetic member 20 is connected to the pedal 10 by multiple bolts 22.

Figure 5:
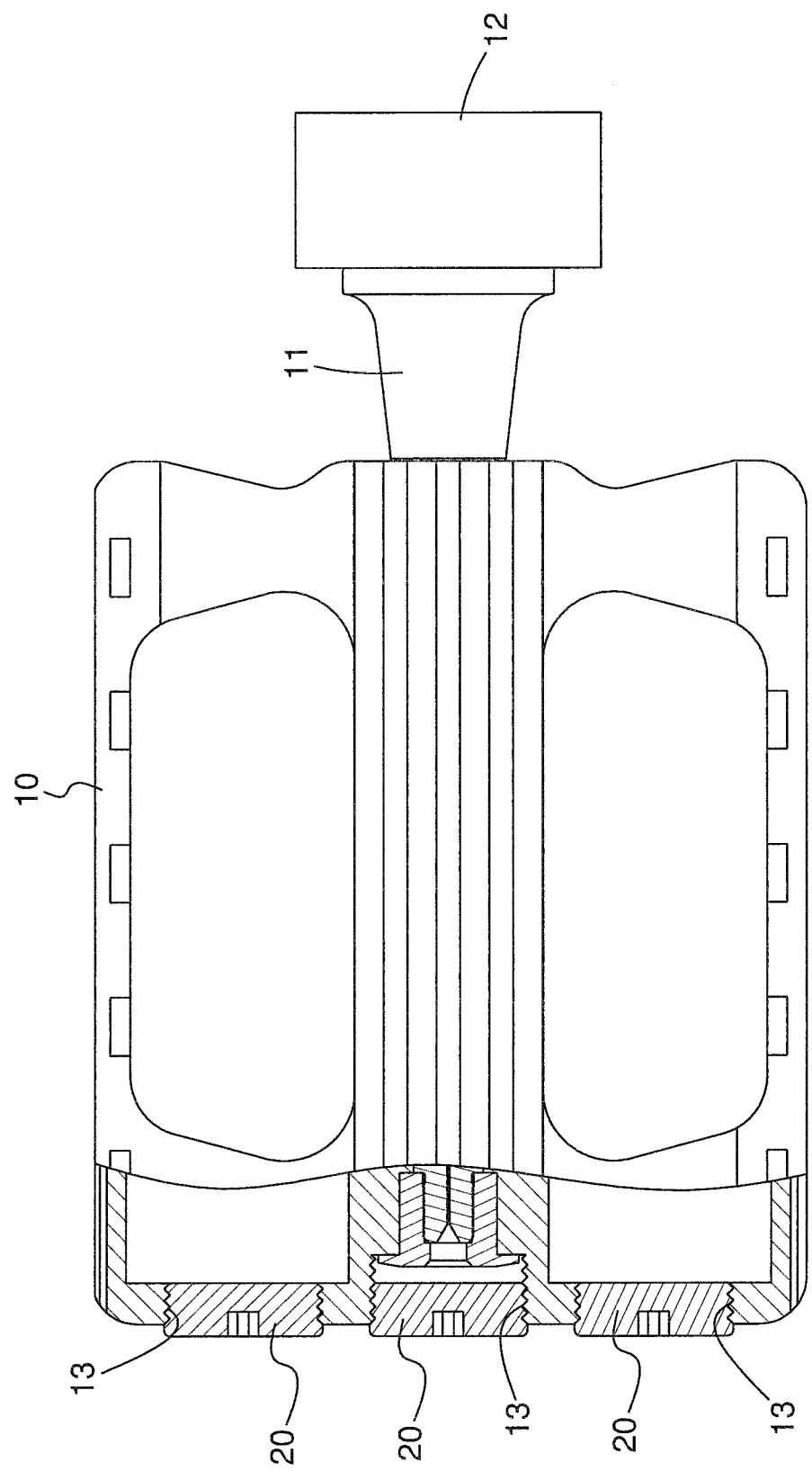
FIG. 5 is a cross sectional view to show the third embodiment of the pedal assembly of the present invention.

FIG. 5 shows that the pedal 10 includes three round rooms 13 defined in the inside thereof. Each room 13 includes inner threads. Each room 13 receives one magnetic member 20, and the magnetic member 20 has outer threads which are threadedly connected to the inner threads of the room 13.

Figure 6:
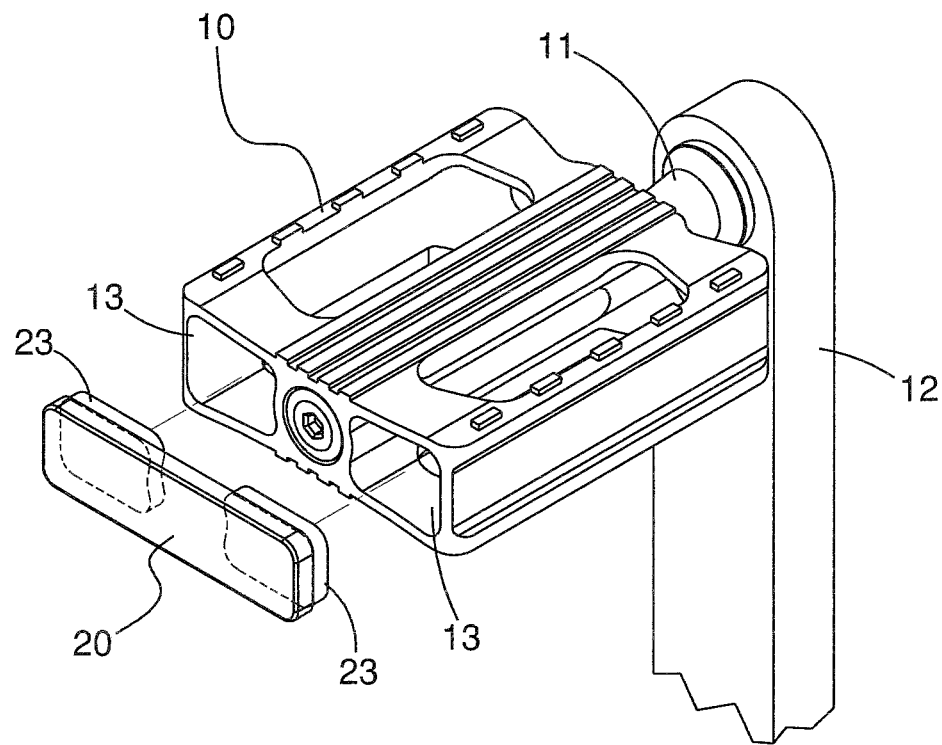
FIG. 6 is an exploded view to show another embodiment of the magnetic member of the pedal assembly of the present invention.
Figure 7:
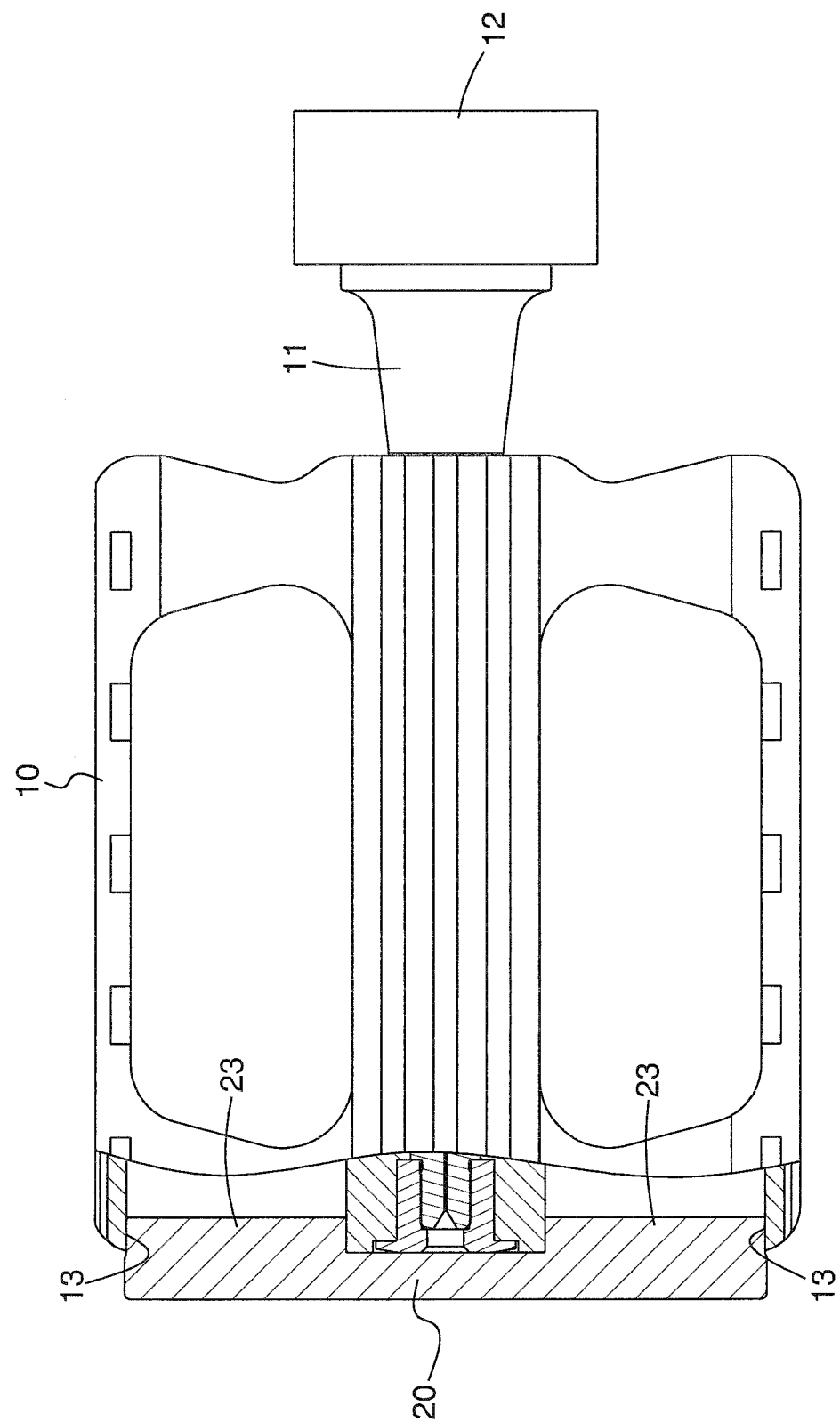
FIG. 7 is a partial cross sectional view to show the magnetic member in FIG. 6 engaged with the rooms of the pedal of the pedal assembly of the present invention.

FIGS. 6 and 7 show that the pedal 10 includes two rooms 13 defined in the inside thereof, and the axle 11 is located between the two rooms 13. There is only one magnetic member 20 which includes two protrusions 23 on the inside thereof. The two protrusions 23 are engaged with the two rooms 13. The two protrusions 23 are force-fitted to the two rooms 13, or the two protrusions 23 are adhered to the two rooms 13.

Figure 8:
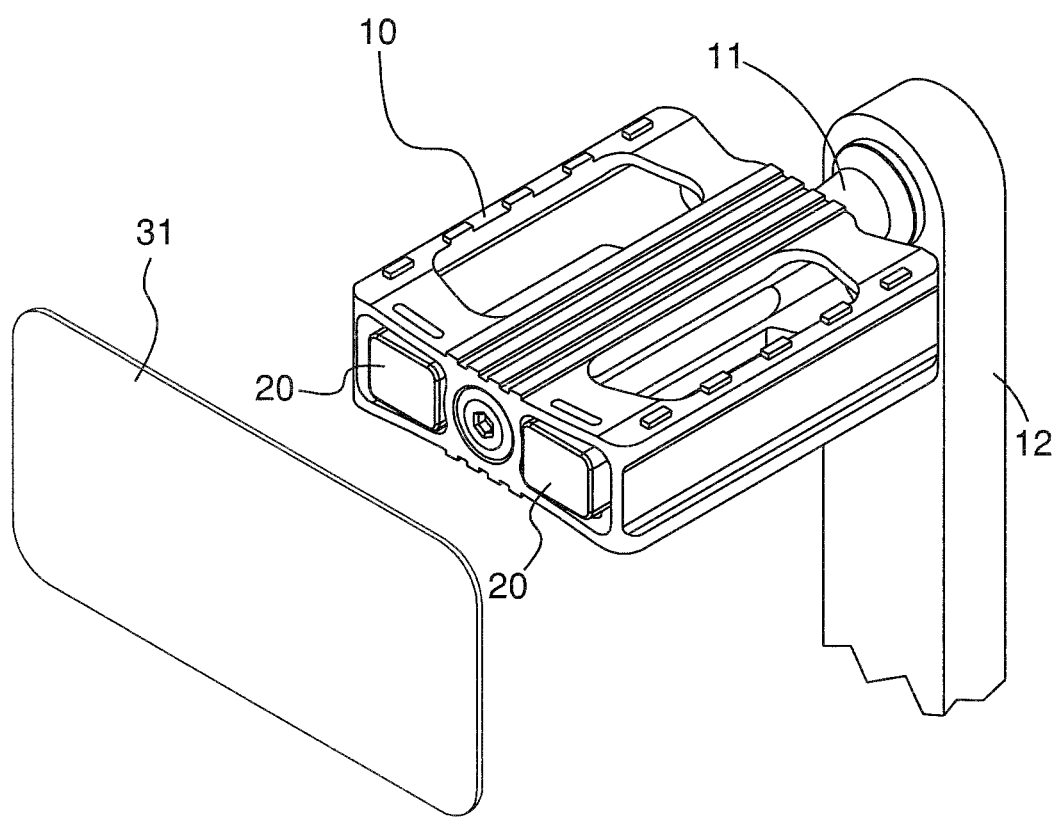
FIG. 8 shows a plate that is magnetically attracted to the magnetic members of the pedal assembly of the present invention.
Figure 9:
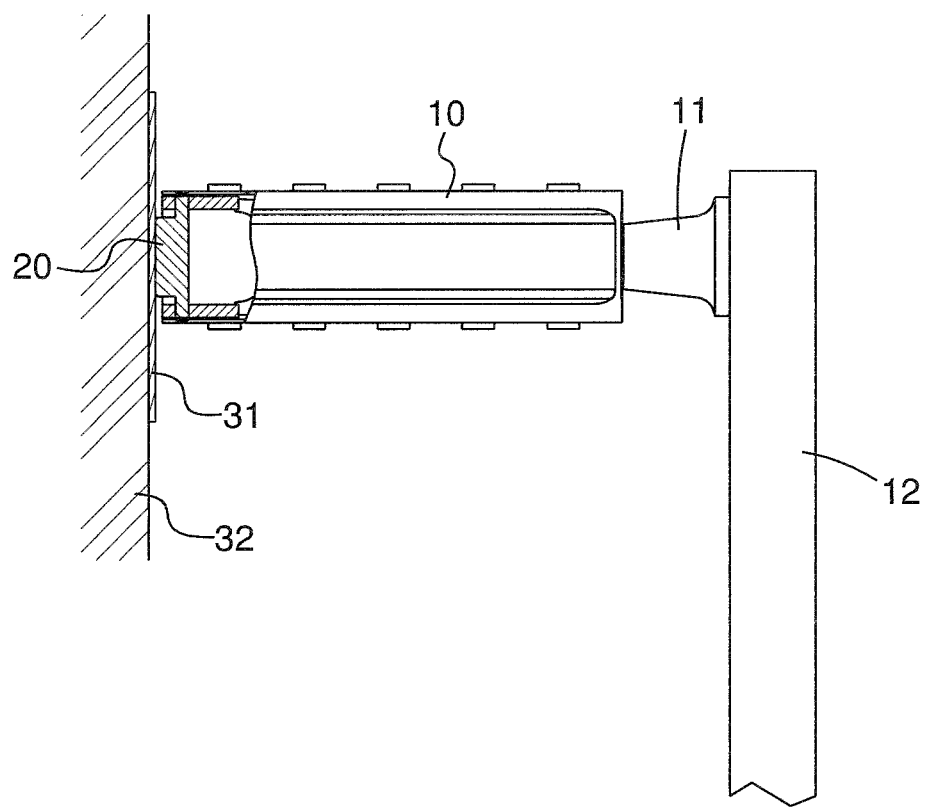
FIG. 9 shows that the pedal assembly of the present invention is magnetically attracted to the plate on an object.

FIGS. 8 and 9 show that a plate 31 having magnetic material is connected to the object 32 which is magnetically attracted by the at least one magnetic member 20. The plate 31 includes a double-sided adhesive member on one side thereof to be adhered to the object 32. The magnetic material of the plate 31 is made from at least one of iron, cobalt and nickel therein which has magnetic moment. The plate 31 can also be connected to the object 32 by using a hook-and-loop strip, a rope, bolts or any known method. The number of the plates 31 can be varied according to need. The number of the magnetic members 20 can also be varied.

The advantages of the present invention are that the magnetic members 20 are tiny and do not need a large space to be installed to the pedals 10, and the magnetic members 20 are light in weight. The installation of the magnetic members 20 to the pedals 10 is easy. The outer appearance of the pedals 10 does not change too much. The magnetic members 20 maintain the bicycle at the upright position when the magnetic members 20 are magnetically attracted to a metal door, a metal post or any object with the magnetic material received therein. Furthermore, the objects that are designed to let the bicycles to be magnetically attracted do not need other links, tubes or parts that protrude beyond the objects.

While embodiments in accordance with the present invention have been shown and described, it should be clear to those skilled in the art that further embodiments may be made without departing from the scope of the present invention.

What is claimed is:

1. A bicycle pedal assembly comprising:
a pedal having an axle rotatably extending therethrough, with a portion of the axle protruding from an inside of the pedal and adapted to be connected to a crank; and
at least one magnetic member connected to the pedal and configured to be attracted to an object being formed of a magnetic material, wherein the pedal includes two rooms defined in the inside thereof and the axle is located between the two rooms, wherein each room has a slot defined in a top wall and a bottom wall thereof, wherein the at least one magnetic member has a resilient member on a top and a bottom thereof, with the resilient member engaged with the slot of one of the two rooms, and wherein a portion of the at least one magnetic member protrudes beyond an outer surface of the pedal.

2. A bicycle pedal assembly comprising:
a pedal having an axle rotatably extending therethrough, with a portion of the axle protruding from an inside of the pedal and adapted to be connected to a crank; and
at least two magnetic members connected to the pedal and configured to be attracted to an object being formed of a magnetic material, wherein the pedal includes multiple rooms defined in the inside thereof and each room includes inner threads, wherein each room receives one of the at least two magnetic members, wherein each magnetic member has outer threads which are threadedly connected to the inner threads of a corresponding one of the multiple rooms.

\* \* \* \* \*